Patented Jan. 8, 1935

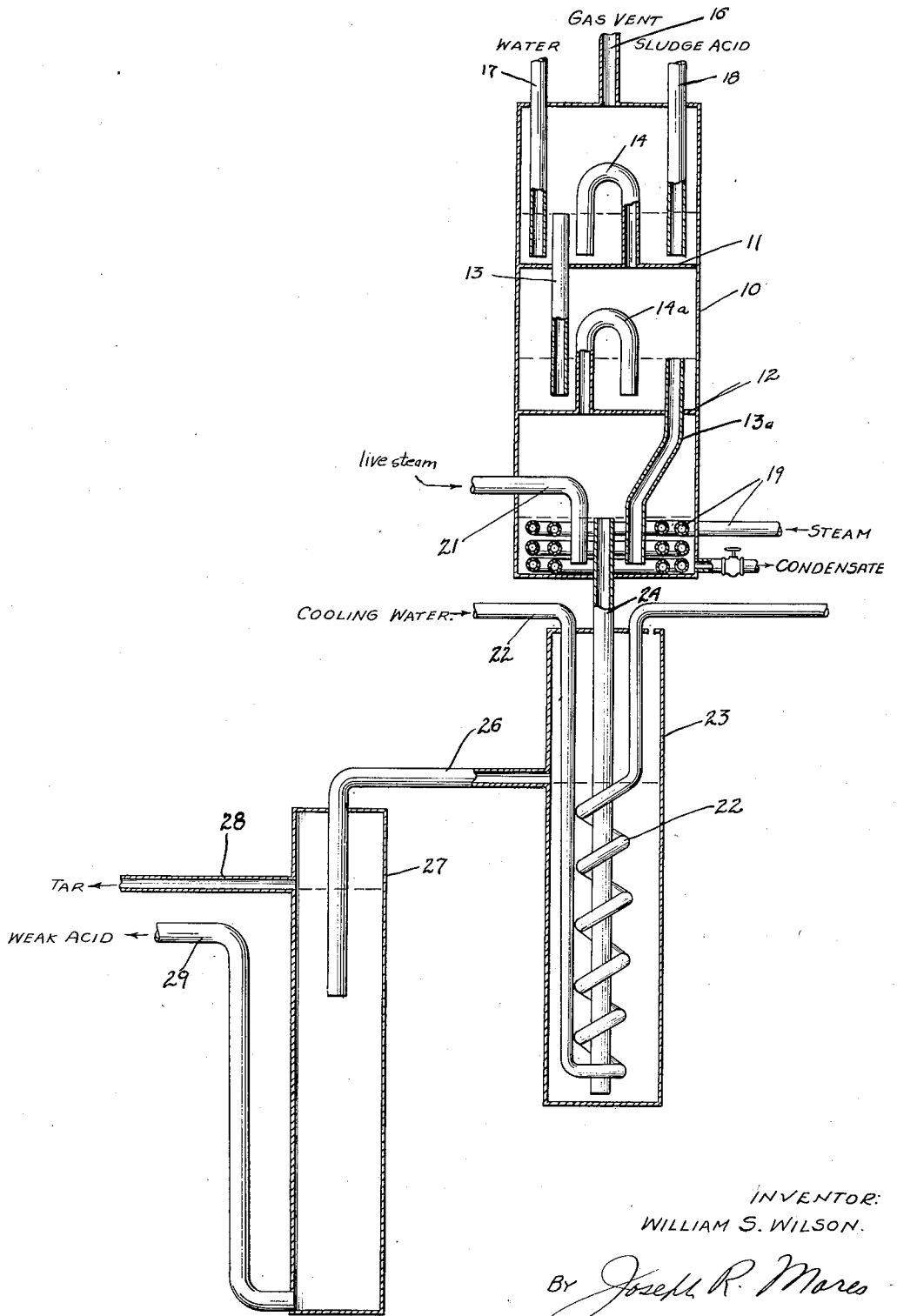

1,987,278

UNITED STATES PATENT OFFICE 1,987,278

METHOD AND APPARATUS FOR TREATING ACID SLUDGE

William S. Wilson, Roslindale, Mass., assignor to Merrimac Chemical Co., Inc., Boston, Mass., a corporation of Massachusetts Application June 16, 1930, Serial No. 461,567

13 Claims. (Cl. 23—173)

This invention relates to the treatment of acid sludge and it has particular application to a method and apparatus for separating the sulphuric acid from the organic constituents present therein.

Acid sludge is a by-product of the oil refining industry and consists of a comparatively large amount of tar or residues which are essentially reaction products of sulphuric acid and unsaturated hydrocarbons mixed with a relatively small amount of free sulphuric acid.

Insofar as the acid sludge contains recoverable free sulphuric acid it is of value. However, the presence of the organic matter makes the separation of the acid difficult and expensive wherefore except in the case of large refineries it has been found more economical to discard the acid sludge than to attempt the recovery of the valuable fraction.

Where recovery of the mineral acid is undertaken it involves, briefly, diluting the acid sludge with water whereby the hydrocarbon-sulphuric acid reaction product is hydrolyzed and sulphur dioxide evolved. Subsequently the hydrolyzed mixture is permitted to separate into an aqueous layer and a tar layer.

While the rate of hydrolysis, as well as the rate of separation of the hydrocarbon layer from the acid layer, depends to a large extent upon the nature of the oil stock from which the acid sludge has been formed, in general, the procedure followed heretofore consists in mixing a measured quantity of water with the acid sludge in a suitable vat, lined preferably with lead or acid resisting brick. Live steam is injected directly into the mass to facilitate thorough mixing. An immediate evolution of large quantities of sulphur dioxide ensues which, however, diminishes after a short period of time. The hydrolysis is allowed to proceed for 2 or 3 hours, while maintaining as high a temperature as is practicable. In order to accelerate the hydrolysis it has been proposed to apply pressure to the vat whereby the temperature may be increased. By so doing it has been possible to reduce to some extent the time of hydrolysis particularly if the temperature be maintained at 275° F. or above.

In either case the reacted mixture is discharged into a separator wherein the aqueous acid layer settles to the bottom and the hydrocarbon layer rises to the top. After a period of two or more hours the separation is generally complete and the fractions are withdrawn from the separator. Thus it can be appreciated that a cycle including the hydrolysis and separation requires several hours; the evolution of sulphur dioxide gas is irregular, the relative amount of gas evolved during the early stages being large, after which it diminishes rapidly until during the latter part of the cycle practically no sulphur dioxide is evolved. Inasmuch as the material treated is highly corrosive it is essential to employ lead or acid resisting materials. Such equipment is necessarily expensive especially since the capacity of the receptacles must be rather large, moreover when the process is operated under pressure it must be reinforced suitably to sustain the added stress.

One object of this invention is to provide a process for separating the inorganic acid from acid sludge whereby practically uniform and constant yet complete evolution of sulphur dioxide is made possible.

A further object of the invention is to provide a method of separating the inorganic acid from the acid sludge tars which makes possible the separation of tar from acid in a substantially shorter period of time than has been required heretofore.

The invention likewise contemplates an apparatus which may be constructed of simple, inexpensive and readily available equipment and which does not require extensive floor space.

I have observed that one may effect the hydrolysis and subsequent physical separation of even the most difficultly hydrolyzed acid sludges in a fraction of the time necessary according to present day practice. In contrast to the results obtainable when acid sludge is treated in a vat with water whereby large volumes of sulphur dioxide are evolved during a short period of time, after which the evolution diminishes quickly to an insignificant amount, the present invention enables one to generate a steady recoverable stream of sulphur dioxide which may be employed conveniently for any desired purpose, as in the manufacture of sulphuric acid. It has further been found that after hydrolysis one may effect a separation of the aqueous acid from the insoluble organic layer in a very much shorter period of time than is possible by present day practice.

These features are attained by continuously mixing at regulated rates water and acid sludge, and steam if necessary, to establish a suitably high temperature. If desired air may be injected into the liquid mixture to facilitate the removal of sulphur dioxide, however, this is not essential to the operativeness of the present invention. The gases generated during the hydrolysis flow, preferably, in a direction countercurrent to that of the acid sludge and water mixture. In some instances the addition of water to the acid sludge is not accompanied by the generation of an adequate quantity of heat, wherefore the heat supply is augmented by an auxiliary steam jet or a steam coil.

Some grades of acid sludge evidence excessive froth formation during the hydrolysis which interferes with the normal operation of the apparatus, particularly the tar and aqueous acid separation equipment. I have found that this can be obviated by cooling the reacted mixture. The cooling thus facilitates the separation of the insoluble hydrolyzed tar from the aqueous acid layer and obviates any tendency of the tar to resinify or polymerize by reason of its exposure to an elevated temperature for a protracted period of time. The cooled reacted mixture is conducted into a continuous separator wherein the acid is permitted to settle to the bottom and the tar is withdrawn from the top, the mixture being introduced into the separator at a point intermediate the aqueous acid discharge pipe and the tar discharge pipe.

A better understanding of the principles of the invention may be had by referring to the accompanying drawing which is a diagrammatical vertical section of an apparatus which may be employed advantageously.

In the apparatus illustrated there is provided a vertical cylindrical tower 10 having two plates 11 and 12 intermediate the extremities which function as partitions to separate the tower into compartments. The plates are equipped with discharge pipes 13, 13a, respectively, which project vertically therethrough and which govern the level of the liquid on the plates. In addition to the discharge pipes, the plates are provided with gas vent pipes 14 and 14a which permit the passage of gas or vapor from the next lower compartment through the plates and which are sealed by the liquid above the plates into which liquid the discharge ends of the pipes are immersed. A gas vent pipe 16 at the upper end of the tower functions to exhaust the gas from the upper compartment. Water and acid sludge are admitted through pipes 17 and 18 respectively, which pipes project into the upper compartment through the top of the tower, the discharge end of each being below the level of the liquid on the upper plate.

In the lower compartment there is provided a steam coil 19 which functions to maintain the desired temperature. In addition one may provide a steam jet 21 through which live steam may be introduced for the purpose of maintaining the desired temperature and facilitating the evolution of sulphur dioxide. Certain acid sludges tend to foam substantially during hydrolysis, particularly when maintained at a high reacting temperature which tendency interferes with the normal operation of the plate tower, as well as the efficacy and rapidity of separation of the tars from the aqueous acid layer. This tendency is overcome by cooling the mixture as by contacting the same with a lead water coil 22 that is enclosed in a vented tank 23. The tank receives the hydrolyzed mixture from the bottom tower compartment through a pipe 24 which interconnects the two and discharges near the bottom of said tank. The cooled liquid mixture is withdrawn from the cooling tank through a conduit 26 which in turn discharges into a separating tower 27. The point of discharge is located at approximately the line of demarcation between the acid and tar were the mixture permitted to separate into distinct layers. Obviously the location of the point of discharge need not be exact. My experience has indicated that the separation of the hydrolyzed mixture is very rapid and requires but very little time when prepared in the manner hereinabove set forth. The tar is withdrawn through a tar discharge duct 28 near the top and the acid through an acid discharge duct 29 at the bottom. The acid discharge pipe 29 is located in such relation with respect to the tar discharge pipe 28 that the separator shall contain a tar layer and an acid layer, the relative depths of which are proportional to the relative volumes of tar and acid in the separated sludge. These requirements are not so rigid however as to prevent wide variations in the quality of the acid sludge used or in the concentration of the resulting weak acid. Conventional means for ascertaining the levels of the respective liquid layers may, of course, be employed.

All of the parts exposed to the acid liquid or vapors are constructed of an acid resisting material such as lead, suitably reinforced to sustain a positive pressure in the event it is desired to effect the hydrolysis at temperatures higher than is possible at atmospheric pressure.

In operating the device, regulated amounts of water and acid sludge are introduced through the pipes 17 and 18 into the top compartment where they are mixed by the agitation incident to the flow of the gas from the middle compartment through the liquid sealed pipe 14, as well as by the generation of sulphur dioxide gas incident to the dilution. The liquid in the upper compartment which is maintained at the level indicated by the broken line, flows downwardly into the middle compartment through the pipe 13 where the hydrolysis continues and is facilitated and promoted by the bubbling of the sulphur dioxide-steam mixture from the lower compartment through the liquid sealed vent pipe 14a. The liquid in the middle compartment flows downwardly through the pipe 13a into the bottom compartment where it is heated by the steam coil 19 and where the hydrolysis is completed. The hydrolyzed mixture which discharges into the tank cooler 23 being freed of any substantial amount of sulphur dioxide is cooled by contacting with the cooling coil 22 through which cold water is circulated and thereafter is conducted into the separator 27 where the tar rises to the top and the weak aqueous acid separates to the bottom from which points they are withdrawn through the pipes 28 and 29 respectively.

The apparatus can easily be so constructed as to be operable under positive pressure. For the acid sludges which I have tested, however, the present process will be found to hydrolyze the product satisfactorily without the application of pressure. It is to be noted that the length of the pipe 24 which is submerged in the fluid being cooled must be slightly greater than the total depth of liquid through which gas is being bubbled in the tower, in order that the pressure differential will not cause a flow of gas in the direction of the separator.

The results obtained in the treatment of acid sludge in the treatment of a cracked west Texas crude and which is relatively difficult to hydrolyze indicate that the rate of hydrolyzation is very rapid and an apparatus of comparatively small dimensions is capable of hydrolyzing large quantities of acid sludge. It is to be noted that the elements constituting the apparatus are readily available or easily constructed and do not necessitate a large floor area for an installation of comparatively large capacity. Thus in an apparatus wherein the elements are arranged substantially as shown and in which the diameter of the hydrolyzing tower is 8 inches, the over all length 40 inches and in which the settling tower is 4 inches in diameter and has an over all length of 42 inches, one may operate at the rate of one gallon of acid sludge per minute.

The reacting mixture on the bottom plate is maintained at its boiling point whereas that on the top plate is slightly below the boiling point. The mean temperature in the settling chamber is approximately 60°-70° F. A weak acid containing 25-35% sulphuric acid can thus be obtained.

It is to be noted that in order to increase the capacity of this unit it is necessary only to increase the diameter of the hydrolyzing tower and the settling chamber, making adequate provisions for heating and cooling the increased volume. It is to be further noted that such increase in capacity will vary approximately as the square of the diameter and that one is therefore enabled to treat very large quantities of acid sludge in a piece of equipment whose cost is very small as compared to equipment which has been employed heretofore.

In lieu of the plate tower illustrated one may substitute a packed tower wherein the acid sludge and water mixture is permitted to trickle over an acid resisting packing in a direction counter-current to that of the steam and evolved sulphur dioxide. If desired the separated hydrocarbons may be washed with water in order to remove any remaining water soluble acid, which water may thereafter be used advantageously for the initial dilution of the acid sludge.

From the description hereinabove set forth it will be apparent to those skilled in the art that I have provided a method and apparatus for treating acid sludge by which the rate of hydrolyzation is very materially increased, resulting in the formation of a sludge and acid mixture which can be separated into layers. The invention enables one to obtain a uniform, recoverable evolution of sulphur dioxide. Moreover, inasmuch as the steam-sulphur dioxide gases flow counter-current to the flow of the reacting mixture, one is enabled to obtain a hydrolyzed product which is relatively free of sulphur dioxide with but a minimum amount of treatment. This process obviates completely the necessity of large hydrolyzing or separating chambers. Furthermore the quantity of material being treated at any time is relatively small, as a result, the explosion hazard which attended the operation of present day equipment is correspondingly reduced.

It will be recognized that although I have illustrated but a single embodiment of an apparatus constructed according to the principles of the present invention many modifications may be instituted since the invention is not limited to any particular type of equipment insofar as the process is concerned and that many changes in the nature of the apparatus may be made without departing from the spirit of the invention.

What I claim is:

1. A method of treating unhydrolyzed acid sludge from petroleum refining which comprises causing acid sludge admixed with water in proper amounts for hydrolyzation to flow downwardly and causing an inert heating medium in gaseous phase to flow upwardly therethrough whereby the liberated sulphur dioxide flows counter-currently with respect to the acid sludge while avoiding any substantial concentration of the acid sludge-water mixture.

2. An apparatus for hydrolyzing acid sludge from petroleum refining and separating the liberated acid from the organic material which comprises a tower having a vent for fumes and inlets for water and acid sludge at the top thereof, a conduit for injecting steam adjacent the bottom of the tower, an outlet for hydrolyzed mixture at the bottom of the tower, said outlet being connected to a cooler and the cooler in turn being connected to a separator for separating by stratification the acid from the organic material.

3. The method of treating acid sludge from petroleum refining which comprises mixing the acid sludge with water and flowing the mixture counter-current to and in contact with a stream of gas containing steam while maintaining such mixture near the boiling point thereof, withdrawing the mixture to a settling zone and permitting the mixture to stratify into an aqueous layer and a tar layer and withdrawing the liquids so separated.

4. The method of treating acid sludge from petroleum refining which comprises mixing the acid sludge with water, flowing the mixture counter-current to and in contact with a stream of gas containing steam and agitating the mixture while maintaining such mixture near the boiling point thereof, effecting stratification of the mixture into a layer of tar and an aqueous layer and removing the layers.

5. The method of treating acid sludge from petroleum refining which comprises mixing the acid sludge with water and flowing the mixture counter-current to and in contact with a stream of gas containing steam and the sulphur dioxide that is evolved thereby while maintaining the mixture at a temperature adequate to effect hydrolysis and thereafter effecting stratification of the resultant mixture into layers.

6. The method of treating acid sludge from petroleum refining which comprises mixing the acid sludge with water and steam at substantially atmospheric pressure to evolve sulphur dioxide gas and flowing the mixture counter-current to and in contact with the stream of steam and evolved sulphur dioxide while maintaining the mixture at a temperature at which hydrolysis effectively occurs.

7. The method of treating acid sludge from petroleum refining which comprises mixing the acid sludge with a substance selected from the group consisting of water and steam and flowing the mixture counter-current to and in contact with a stream of steam and sulphur dioxide evolved by the treatment, cooling the mixture and effecting stratification thereof into an aqueous layer and a tar layer.

8. The method of treating acid sludge from petroleum refining which comprises intimately mixing the acid sludge with a material selected from a class consisting of water and steam and flowing the mixture counter-current to and in contact with a stream of gas containing the steam while maintaining the mixture near the boiling point thereof and thereafter separating the aqueous liquid from the tar.

9. The method of treating acid sludge from petroleum refining which comprises mixing the acid sludge with a material selected from a group consisting of steam and water and flowing the mixture counter-current to and in contact with a stream of gas containing steam and sulphur dioxide evolved in the process while maintaining such mixture near the boiling point thereof, subsequently cooling the mixture and thereafter separating the aqueous liquid from the tar.

10. The method of treating acid sludge from petroleum refining which comprises mixing the acid sludge with water and steam and flowing the mixture counter-current to and in contact with a stream of steam to effect a scrubbing action and subsequently effecting stratification of the mixture.

11. The method of treating acid sludge from petroleum refining which comprises mixing the acid sludge with water and steam and flowing the mixture counter-current to and in contact with a stream of steam to effect a scrubbing action, cooling the scrubbed mixture and subsequently effecting stratification.

12. The method of treating acid sludge from petroleum refining which comprises mixing the acid sludge with water and steam and flowing the mixture counter-current to and in contact with a stream of steam to effect a scrubbing action and subsequently effecting stratification of the mixture into an aqueous layer and a hydrocarbon layer, the flow of water and steam being regulated to produce a sulphuric acid content ranging from 25 to 35% in the aqueous layer.

13. The method of treating acid sludge from petroleum refining which comprises mixing the acid sludge with water and flowing the mixture downwardly through a tower in counter-current flow to an upwardly flowing stream of steam which is commingled therewith while avoiding substantial concentration of the aqueous fraction, to eliminate sulphur dioxide, removing the sulphur dioxide at the top of the tower and removing the immiscible fractions at the base of the tower, one fraction consisting essentially of aqueous sulphuric acid and the other fraction consisting of water immiscible organic material.

WILLIAM S. WILSON.